US010710408B2

(12) United States Patent
Forte et al.

(10) Patent No.: US 10,710,408 B2
(45) Date of Patent: Jul. 14, 2020

(54) RUBBER COMPOUND TO PRODUCE TREADS

(71) Applicant: BRIDGESTONE CORPORATION, Tokyo (JP)

(72) Inventors: Gianluca Forte, Rome (IT); Claudia Aurisicchio, Rome (IT); Giammatteo Gaeta, Rome (IT)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 156 days.

(21) Appl. No.: 15/752,612

(22) PCT Filed: Aug. 31, 2016

(86) PCT No.: PCT/IB2016/055206
§ 371 (c)(1),
(2) Date: Feb. 14, 2018

(87) PCT Pub. No.: WO2017/037636
PCT Pub. Date: Mar. 9, 2017

(65) Prior Publication Data
US 2018/0236814 A1 Aug. 23, 2018

(30) Foreign Application Priority Data
Aug. 31, 2015 (IT) .................. 102015000047465

(51) Int. Cl.
*B60C 1/00* (2006.01)
*C08L 9/06* (2006.01)
*C08L 25/10* (2006.01)
*C08L 67/04* (2006.01)

(52) U.S. Cl.
CPC ............. *B60C 1/0016* (2013.01); *C08L 9/06* (2013.01); *C08L 25/10* (2013.01); *C08L 67/04* (2013.01)

(58) Field of Classification Search
None
See application file for complete search history.

(56) References Cited

U.S. PATENT DOCUMENTS

2007/0032593 A1* 2/2007 Yagi ..................... B60C 1/00
524/575.5

FOREIGN PATENT DOCUMENTS

| EP | 1 749 855 A2 | 2/2007 |
| WO | 2011/114990 A1 | 9/2011 |

OTHER PUBLICATIONS

International Search Report for PCT/IB2016/055206 dated Dec. 14, 2016 [PCT/ISA/210].
Written Opinion of the International Searching Authority for PCT/IB2016/055206 dated Dec. 14, 2016 [PCT/ISA/237].

* cited by examiner

*Primary Examiner* — Ana L. Woodward
(74) *Attorney, Agent, or Firm* — Sughrue Mion, PLLC

(57) ABSTRACT

A rubber compound for treads comprising a styrene-butadiene rubber (SBR), carbon black and a vulcanization system. The filler comprises 5 to 30 phr of a thermoplastic polymer, preferably polylactic acid, having a Tg ranging from 50 to 70° C., a molecular weight (Mw) not exceeding 200,000 g/mol and a crystallinity not exceeding 0%.

12 Claims, No Drawings

RUBBER COMPOUND TO PRODUCE TREADS

CROSS REFERENCE TO RELATED APPLICATIONS

This application is a National Stage of International Application No. PCT/IB2016/055206 filed Aug. 31, 2016, claiming priority based on Italian Patent Application No. 102015000047465 filed Aug. 31, 2015.

TECHNICAL FIELD

The present invention concerns a compound to produce treads. In particular the present invention concerns a compound for TBR tyre treads, to which the description will explicitly refer without loss of generality.

BACKGROUND ART

In the field of tyres, part of the research is aimed at improving performance in terms of roadholding but without this entailing a deterioration in terms of rolling resistance and abrasion resistance.

In fact, as is known to a person skilled in the art, many of the possible solutions able to provide improvements in terms of roadholding necessarily entail a deterioration in terms of rolling resistance and abrasion resistance.

For example, although it is known that an increase in the quantity of silica in the tread compound results in an improvement in roadholding on wet surfaces, it has nevertheless been experimentally ascertained that this causes a deterioration in terms of abrasion resistance.

The need was therefore felt for a compound with technical characteristics such as to give the resulting tread improved performance in terms of roadholding, without this entailing a deterioration in performance in terms of rolling resistance and abrasion resistance.

As is known to a person skilled in the art, polymers have a high rigidity when they are subject to a temperature lower than their transition temperature, which is considerably higher in thermoplastic polymers compared to elastomeric polymers, generally used in tyre compounds.

The Applicant has produced a solution which, by exploiting this characteristic of thermoplastic polymers, is able to meet the above requirements.

Surprisingly, the Applicant has also gone beyond the above requirements. In fact, the solution subject of the present invention has improved performance relative to roadholding, at the same time also improving performance relative to rolling resistance and abrasion resistance.

DISCLOSURE OF INVENTION

The subject of the present invention is a rubber compound for tread comprising a styrene-butadiene rubber (SBR), carbon black and a vulcanization system; said compound being characterized in that said filler comprises 5 to 30 phr of a thermoplastic polymer having a Tg ranging from 50 to 70° C., a molecular weight (Mw) not exceeding 200,000 g/mol and a crystallinity not exceeding 10%.

Here and below by the term "tread" we mean the whole unit formed by the cap portion and base portion of the tread. In fact, many tyres have a tread composed of the combination of the above-mentioned portions, the respective compounds of which differ from one another and the relative thickness of which varies according to the type of the relative tyre. In this way, it is understood that the present invention can be applied either only to the compound relative to the cap portion or to both the compounds relative to the cap portion and base portion respectively.

Here and below, by the term "polymer base with cross-linkable unsaturated chain" we mean any natural or synthetic unsaturated polymer able to take on all the chemical-physical and mechanical characteristics typical of elastomers following cross linking (vulcanization) with sulphur-based systems.

Here and below, by "vulcanization system" we mean a complex of ingredients comprising at least sulphur and accelerating compositions, which in preparation of the compound are added in a final mixing phase, and have the purpose of promoting vulcanization of the polymer base once the compound is subjected to a vulcanization temperature.

The Tg of the thermoplastic polymer can be measured with the method according to the ASTM-D7426 standard.

The molecular weight of the thermoplastic polymer can be measured with the method according to the ISO-11344 standard. The crystallinity of the thermoplastic polymer can be measured with the method according to the ISO-3146 standard.

It has been experimentally proved that when the thermoplastic polymer has a molecular weight higher than 200,000 g/mol, it cannot be homogeneously dispersed in the compound and, consequently, the advantages connected with the use thereof cannot be guaranteed. Furthermore, the thermoplastic polymer with molecular weight higher than 200,000 g/mol would also cause problems with processability of the compound.

Furthermore, it has been experimentally proved that the use of a thermoplastic polymer with a crystallinity higher than 10% results in loss of the advantages obtained in terms of roadholding after a brief period of use of the tyre. Said phenomenon is due to the fact that the thermoplastic polymer undergoes a crystallization process during use of the tyre, and to the fact that, beyond a certain degree of crystallization, the thermoplastic polymer is no longer able to provide the required advantages. In fact, if a thermoplastic polymer with a high degree of crystallization were used right from the beginning, the extreme degree of crystallization would be obtained in a relatively short time, thus compromising the relative advantages in an equally short time.

As is known to a person skilled in the art, the degree of crystallinity of a polymer depends on the cooling speed during solidification, and on the configuration of the chains. During the crystallization process by cooling starting from the melting temperature, the chains, which are very dispersed and tangled in the viscous liquid, have to take on an orderly configuration. For this to occur, sufficient time must be left for the chains to move and align. The fact that a polymer is crystalline is closely linked to its regular configuration and constitution and not to its molecular weight.

Another important characteristic of the compound subject of the present invention concerns the presence of SBR. In fact, it has been ascertained that the use of other polymer bases with a lower Tg than that of SBR does not guarantee the levels of rigidity necessary to obtain the advantages described below.

Preferably, polylactic acid is present in the compound in a quantity ranging from 5 to 15 phr.

Preferably, said thermoplastic polymer is polylactic acid.

Preferably, the polylactic acid has a molecular weight ranging from 80,000 g/mol to 150,000 g/mol.

Preferably, the polylactic acid has a crystallinity not exceeding 7%.

A further subject of the present invention is a tread produced with a compound according to the present invention. A further subject of the present invention is a tyre comprising a tread produced with a compound according to the present invention.

A further subject of the present invention is the use of a polylactic acid having a Tg ranging from 50 to 70° C., a molecular weight not exceeding 200,000 g/mol and a crystallinity not exceeding 10% as a filler in tread compounds.

BEST MODE FOR CARRYING OUT THE INVENTION

Embodiment examples are given below for purely illustrative non-limiting purposes.

Examples

Two compounds according to the invention (A and B) were prepared comprising polylactic acid at two different concentrations as the filler, and a comparison compound (Comp.) representing the current technology which does not include the presence of polylactic acid as the thermoplastic polymer.

The compounds of the examples are compounds for TBR tyre treads.

The procedure for preparing the compounds described in the examples is given below. This procedure does not represent a limitation for the present invention.

Preparation of the Compounds (1st Mixing Step)
The ingredients reported in Table I with the exclusion of the vulcanization agents and the zinc oxide were loaded in a mixer with tangential rotors and internal volume ranging from 230 to 270 litres before beginning the mixing, reaching a filling factor of 66-72%.

The mixer was operated at a speed of 40-100 r.p.m./minute, and the mixture formed was discharged once a temperature of 140-170° C. had been reached.
(2nd Mixing Step)
The mixture produced as above was processed again in the mixer operated at a speed of 40-60 r.p.m./minute. Subsequently, the compound was discharged once a temperature of 130-150° C. had been reached.
(Final Mixing Step)
The vulcanization agents and the zinc oxide were added to the mixture obtained from the preceding mixing step reaching a filling factor of 63-67%.

The mixer was operated at a speed of 20-40 r.p.m./minute, and the mixture formed was discharged once a temperature of 100-110° C. had been reached.

Table I shows the phr compositions of the compounds of the examples.

TABLE I

|  | Comp. | A | B |
|---|---|---|---|
| S-SBR |  | 100 |  |
| Carbon black |  | 30 |  |
| Polylactic acid | — | 10 | 20 |
| ZnO |  | 3 |  |
| Sulphur |  | 2 |  |
| Accelerant |  | 1 |  |

S-SBR is a polymer base obtained by means of a process of polymerization in solution with a mean molecular weight ranging from $500 \times 10^3$ to $1500 \times 10^3$, and styrene content ranging from 20 to 45%.

The polylactic acid used is produced by the company NATUREWORKS and marketed under the name INGEO BIOPOLYMER 2003D®. Specifically, the polylactic acid used has a molecular weight of 100000 g/mol, a Tg of 60° C. and a crystallinity of 5-100.

The carbon black used is type N234.

The vulcanization accelerant used is cyclohexyl-benzothiazole-sulfenamide (CBS).

The compounds reported in Table I underwent a series of tests to evaluate the properties connected with rolling resistance, roadholding, abrasion resistance and ultimate elongation.

The abrasion resistance was measured according to the ISO 4649 standard.

The rolling resistance, rigidity and roadholding were evaluated on the basis of the dynamic properties measured according to the ISO 4664 standard.

In particular, as is known to a person skilled in the art, the rolling resistance parameter is evaluated according to the values of tan δ (the lower the tan δ value, the better the rolling resistance), the roadholding parameter is evaluated according to the values of tan δ at 100° C. (the higher the tan δ value, the better the roadholding), while the rigidity parameter is evaluated according to the values of E' at ambient temperature (the higher the value of E', the greater the rigidity).

The ultimate elongation was measured according to the ASTM D412C standard.

Table II shows the results obtained in terms of roadholding, abrasion resistance, rolling resistance, rigidity and ultimate elongation. The results are expressed in indexed form on the basis of the results obtained from the comparison compound (Comp.) which represents the current technology.

TABLE II

|  | Comp. | A | B |
|---|---|---|---|
| Roadholding | 100 | 120 | 130 |
| Abrasion resistance | 100 | 105 | 105 |
| Rolling resistance | 100 | 95 | 100 |
| Rigidity | 100 | 115 | 135 |
| Ultimate elongation | 100 | 110 | 100 |

As appears evident from the data reported in Table II, the compounds produced according to the teachings of the present invention are able, by means of the addition of polylactic acid, as a thermoplastic polymer in the conditions reported in the claims, to guarantee improvements with respect to the current technology both in terms of roadholding and in terms of rigidity and rolling resistance.

In particular, from the data of Table II it can be seen that the compound A with 10 phr of polylactic acid gives overall better results than the compound B with 20 phr of polylactic acid.

The invention claimed is:

1. A rubber compound for tyre treads comprising a styrene-butadiene rubber (SBR), carbon black and a vulcanization system; said compound comprising a filler comprising 5 to 30 phr of a thermoplastic polymer having a Tg ranging from 50 to 70° C., a weight-average molecular weight (Mw) not exceeding 200,000 g/mol and a crystallinity not exceeding 10%.

2. A rubber compound for tyre treads according to claim 1, comprising 5 to 15 phr of said thermoplastic polymer.

3. A rubber compound for tyre treads according to claim 1, wherein said thermoplastic polymer is polylactic acid.

4. A rubber compound according to claim 3, wherein the polylactic acid has a weight-average molecular weight ranging from 80,000 g/mol to 150,000 g/mol.

5. A rubber compound for tyre treads according to claim 3, wherein the polylactic acid has a crystallinity not exceeding 7%.

6. A tyre tread manufactured with a compound according to claim 1.

7. A tyre comprising a tread according to claim 6.

8. A method of making a tyre tread comprising combining a styrene-butadiene rubber, carbon black, a filler compound and vulcanization agents, and wherein the filler compound comprises a thermoplastic polymer having a Tg ranging from 50 to 70° C., a weight-average molecular weight not exceeding 200,000 g/mol and a crystallinity not exceeding 10%.

9. The method according to claim 8, wherein said thermoplastic polymer is polylactic acid.

10. The method according to claim 9, wherein the polylactic acid has a molecular weight ranging from 80,000 g/mol to 150,000 g/mol.

11. The method according to claim 9, wherein the polylactic acid has a crystallinity ranging from 2 to 7%.

12. The method according to claim 8, wherein said thermoplastic polymer is present in the compound in a quantity ranging from 5 to 15 phr.

* * * * *